(12) United States Patent
Ohara et al.

(10) Patent No.: US 7,934,992 B2
(45) Date of Patent: May 3, 2011

(54) GAMING MACHINE, GAME SYSTEM, ITS PROGRAM, AND RECORDING MEDIUM

(75) Inventors: Toru Ohara, Tokyo (JP); Kazuo Komuro, Tokyo (JP); Shinya Yamauchi, Tokyo (JP); Jun Matsunaga, Tokyo (JP); Yasuhiro Nishiyama, Tokyo (JP); Kentaro Nemoto, Tokyo (JP)

(73) Assignee: Sega Corporation, Tokyo (JP)

( * ) Notice: Subject to any disclaimer, the term of this patent is extended or adjusted under 35 U.S.C. 154(b) by 96 days.

(21) Appl. No.: 11/665,257

(22) PCT Filed: Oct. 6, 2005

(86) PCT No.: PCT/JP2005/018554
§ 371 (c)(1),
(2), (4) Date: Sep. 12, 2007

(87) PCT Pub. No.: WO2006/041012
PCT Pub. Date: Apr. 20, 2006

(65) Prior Publication Data
US 2008/0153562 A1    Jun. 26, 2008

(30) Foreign Application Priority Data
Oct. 12, 2004 (JP) ................. 2004-297966

(51) Int. Cl.
*A63F 9/24* (2006.01)
*A63F 13/00* (2006.01)
(52) U.S. Cl. ............... 463/29; 463/16; 463/20; 463/25; 463/40
(58) Field of Classification Search ............ 463/16, 463/23, 25, 40, 42, 29
See application file for complete search history.

(56) References Cited

U.S. PATENT DOCUMENTS 5,259,907 A    11/1993   Soules et al.
6,196,918 B1 *  3/2001   Miers et al. ............... 463/13
(Continued)

FOREIGN PATENT DOCUMENTS

EP    0 972 549 A1    6/1999
(Continued)

OTHER PUBLICATIONS

'The Jan Ken Pon', "94-95 Year Book of Amusement Machines & Amusement Park Equipment", Amusement Industry Publishing Corp., Japan, Feb. 21, 1996, p. 188.
(Continued)

*Primary Examiner* — Dmitry Suhol
*Assistant Examiner* — Ryan Hsu
(74) *Attorney, Agent, or Firm* — Arent Fox LLP

(57) ABSTRACT

A game machine which uses play items such as cards and which enables the player to play a game seriously and to concentrate in the game so as to win over the opponent is provided according to the present invention.

The game machine controls the progress of a game based on data read out from the play items, and issues a new play item for each game played. The game machine includes means for setting a game fee at a discount rate in accordance with the number of previous consecutive wins for the player to try a next post-victory bonus game after winning one game, and means for determining the number of games played based on the outcome (win or loss) of the player's previous games and for issuing new play items collectively to the player by the number corresponding to the determined number of games played.

6 Claims, 12 Drawing Sheets

U.S. PATENT DOCUMENTS

| | | | |
|---|---|---|---|
| 6,443,837 B1 | 9/2002 | Jaffe et al. | |
| 6,468,162 B1 * | 10/2002 | Nakamura | 463/43 |
| 6,860,810 B2 * | 3/2005 | Cannon et al. | 463/20 |
| 7,169,047 B2 * | 1/2007 | Benbrahim | 463/25 |
| 7,192,352 B2 * | 3/2007 | Walker et al. | 463/42 |
| 2002/0086725 A1 * | 7/2002 | Fasbender et al. | 463/11 |
| 2003/0060248 A1 * | 3/2003 | Yamashita | 463/1 |
| 2003/0157978 A1 * | 8/2003 | Englman | 463/16 |
| 2003/0236110 A1 * | 12/2003 | Beaulieu et al. | 463/1 |
| 2003/0236115 A1 * | 12/2003 | Chamberlain | 463/16 |
| 2004/0002377 A1 * | 1/2004 | Staw et al. | 463/25 |
| 2004/0235548 A1 * | 11/2004 | Benbrahim | 463/16 |
| 2005/0032564 A1 * | 2/2005 | Sines | 463/13 |
| 2005/0079908 A1 * | 4/2005 | Pacey | 463/20 |
| 2006/0035696 A1 * | 2/2006 | Walker et al. | 463/16 |

FOREIGN PATENT DOCUMENTS

| | | |
|---|---|---|
| EP | 1 319 430 A1 | 6/2003 |
| FR | 2 540 737 A1 | 8/1984 |
| JP | 2-75091 A | 3/1990 |
| JP | 6-304333 A | 11/1994 |
| JP | 2002-301264 A | 10/2002 |
| JP | 2003-62331 A | 3/2003 |

OTHER PUBLICATIONS

'Tama & Friends Daiundoukai', "95-95 Year Book of Amusement Machines & Amusement Park Equipment", Amusement Industry Publishing Corp., Japan, Feb. 21, 1996, p. 185.

\* cited by examiner

US 7,934,992 B2

GAMING MACHINE, GAME SYSTEM, ITS PROGRAM, AND RECORDING MEDIUM

CROSS-REFERENCE TO RELATED APPLICATION

This application is a National Stage entry of International Application No. PCT/JP2005/018554, filed Oct. 6, 2005, the entire specification claims and drawings of which are incorporated herewith by reference.

TECHNICAL FIELD

The present invention relates to a game machine which uses play items such as cards with data recorded thereon to operate a game by reading out the data on the play items and displaying the game contents on a monitor screen, and to a game system, a program which controls the operation of this game machine, and a recording medium on which this program is recorded.

BACKGROUND ART

Football simulation card game machines have been well known as card game machines which use cards as play items. With this card game machine, when a game player sets player cards on a card placement panel, an image sensor inside the machine reads out data recorded on the back side of the cards to generate data of football players who will form a team so that the game is started. The player can give instructions on the position or formation of the football players by changing the arrangement of the player cards. The players of such card games can take pleasure in collecting cards such as the player cards they can use in the card games.

The invention disclosed in Patent Document 1 below proposes one such card game machine as described above.

The card game machine described in Patent Document 1 is a machine which executes the football simulation card game described above. Disclosed in Patent Document 1 is that a new player card is issued from a card issuing unit of the card game machine when a game ends, so that the game player can have one more player card each time a game ends, which enables the game player in a next game to select or replace the football players more easily using the newly obtained player cards.

In amusement arcades or the like, there are provided a variety of game machines including video games other than card game machines. These game machines are required to improve the occupancy rate and increase the profit of the amusement arcade, and to make the game players to wish to continue the games, i.e., to provide "interesting" game contents. Patent Document 2 below describes an invention which proposes a game machine for solving these problems.

The video game machine proposed in Patent Document 2 includes fee collecting means for collecting a predetermined game fee from a player, game operating means for starting a game from one of different game stages and for displaying game screens on the monitor, game results rating means for rating the game results at the end of a game, and fee setting means for setting a fee for a next continued game based on the ratings. Further disclosed in Patent Document 2 is that the game results rating means permits the player to play a continued game to a next game stage at a discount rate if the results at the end of the game satisfies a certain level.

Patent Document 1: Japanese unexamined Patent Publication No. 2002-301264 (P. 15-17 of the Specification and FIG. 26)

Patent Document 2: Japanese unexamined Patent Publication No. Hei 6-304333 (P. 3-6 of the Specification and FIGS. 3 and 5)

DISCLOSURE OF THE INVENTION

Problems to be Solved by the Invention

The card game machine described in Patent Document 1 above is controlled such that a new player card is randomly selected and issued every time a game ends. One problem was that when the player obtains a high-value player card such as a card which represents a famous player, the player is satisfied and less interested in playing a next game. Some players would even lose a game intentionally so as to end the game quickly and obtain a new player card. This led to another problem that the opponent player who may be performing a fair play with well-thought tactics also feels less interested in playing the game.

As for the video game machine described in Patent Document 2 above, its object is merely to increase the occupancy rate or the profit by encouraging players who have reached a certain stage to continue playing the game. Also, the invention described in the document is not aimed at encouraging each player to take the outcome of the game being played seriously and to concentrate in the game even in cases where freebies such as cards are given out irrespective of the game outcome at the end of a game, for example in a game where two or more players compete against each other.

Furthermore, with the video game machine described in the document, when the results of a previous game satisfy a certain level, the discount rate applies only to the next one game. That is, the invention described in Patent Document 2 does not mention any use of means which enhances the player's desire to play another game by applying the discount rate to the game after the next if the player's game results satisfied a certain level in the previous game as well as in the following game.

The present invention was devised to solve the problems encountered by the conventional game machines described above, and an object of the invention is to provide a game machine having means for encouraging the player to take the game being played seriously and to concentrate in the game to win over the opponent, and a program which controls the operation of this game machine, and a recording medium on which this program is recorded.

Means for Solving the Problems

The present invention provides a game machine provided with game control means including: game fee collecting means for collecting a game fee from a player; game outcome determination means for controlling a progress of a game wherein it reads data recorded on a play item and displays a game screen, and for determining an outcome (win or loss) of the game; and play item issuing means for issuing a new play item to the player per one game, the game control means comprising:

game fee setting means for setting a game fee for the player to try a next post-victory bonus game when the game outcome determination means decides that the player has won; and post-victory bonus game selection means for allowing the player to select whether or not the player wishes to try the post-victory bonus game, wherein the game control means controls the play item issuing means such that, when the game outcome determination means decides that the player has lost, or when the post-victory bonus game selection means determines that the player has selected not to try the post-victory bonus game, then the new play item is issued by the number corresponding to the number of games played by the player; and wherein the game control means controls the game such that, when the post-victory bonus game selection means determines that the player has selected to try the post-victory bonus game, then the player is permitted to try the next post-victory bonus game at a game fee set by the game fee setting means.

The "play item" mentioned above indicates data-recorded cards (trading card) which have conventionally been used as a game medium of a card game, or shaped articles such as figures used for playing the game with a sticker or the like printed with coded information stuck on the back side of the figure base.

The "game" referred to in the present invention may be any game which can be played between one player and his/her opponent and which ends with an outcome, i.e., one of the players winning and the other losing, for example, a game which uses the play items described above such as card games, which may be a football simulation game or a battle game.

Furthermore, the present invention provides a game machine in which the game control means further comprises means for counting the number of consecutive wins the player has obtained by consecutively trying and winning the post-victory bonus game, and controls the play item issuing means such that when the number of consecutive wins has reached a predetermined value, the new play items are issued by the number corresponding to the predetermined value.

Furthermore, the present invention provides a game machine in which the game fee setting means includes means for setting a game fee at a discount rate for the post-victory bonus game based on a number of consecutive tries at the post-victory bonus game.

Furthermore, the present invention provides a game machine which further includes a match game program and data for enabling the player to play a game with the game machine as the opponent.

The present invention also provides a game system including a plurality of the game machines described above connected in communication with each other and controlled so that a game can be played between/among the game machines based on communication data transmitted between/among the game machines.

The present invention also provides a game control program for controlling an operation of a game machine, the game control program being provided in the game machine and including: game fee collecting means for collecting a game fee from a player; game outcome determination means for controlling a progress of a game wherein it reads data recorded on a play item and displays a game screen, and for determining an outcome (win or loss) of the game; and play item issuing means for issuing a new play item to the player per one game, the game control program comprising the steps of:

setting a game fee for the player to try a next post-victory bonus game when the game outcome determination means decides that the player has won;

allowing the player to select whether or not the player wishes to try the post-victory bonus game, controlling the play item issuing means such that, when the game outcome determination means decides that the player has lost, or when it is determined that the player has selected not to try the post-victory bonus game in the post-victory bonus game selection step, then the new play item is issued by the number corresponding to the number of games played by the player; and controlling the game such that, when it is determined that the player has selected to try the post-victory bonus game in the post-victory bonus game selection step, then the player is permitted to try the next post-victory bonus game at the game fee set by the game fee setting step.

The game control program of a game machine further comprises the steps of:

counting the number of consecutive wins the player has obtained by consecutively trying and winning the post-victory bonus game; and controlling the play item issuing means such that when the number of consecutive wins has reached a predetermined value, the new play items are issued by the number corresponding to the predetermined value.

According to the present invention, the game fee setting step in the game control program further includes a step of setting the game fee at a discount rate based on the number of consecutive tries at the post-victory bonus game.

The present invention also provides a computer-readable recording medium on which the game control program of a game machine described above is recorded.

The computer-readable recording medium applicable in the invention includes a disk medium such as a CD-ROM, a DVD-ROM, and a hard disk device, and an electrical recording storage medium such as a mask ROM.

BEST MODE FOR CARRYING OUT THE INVENTION

Figure 1:
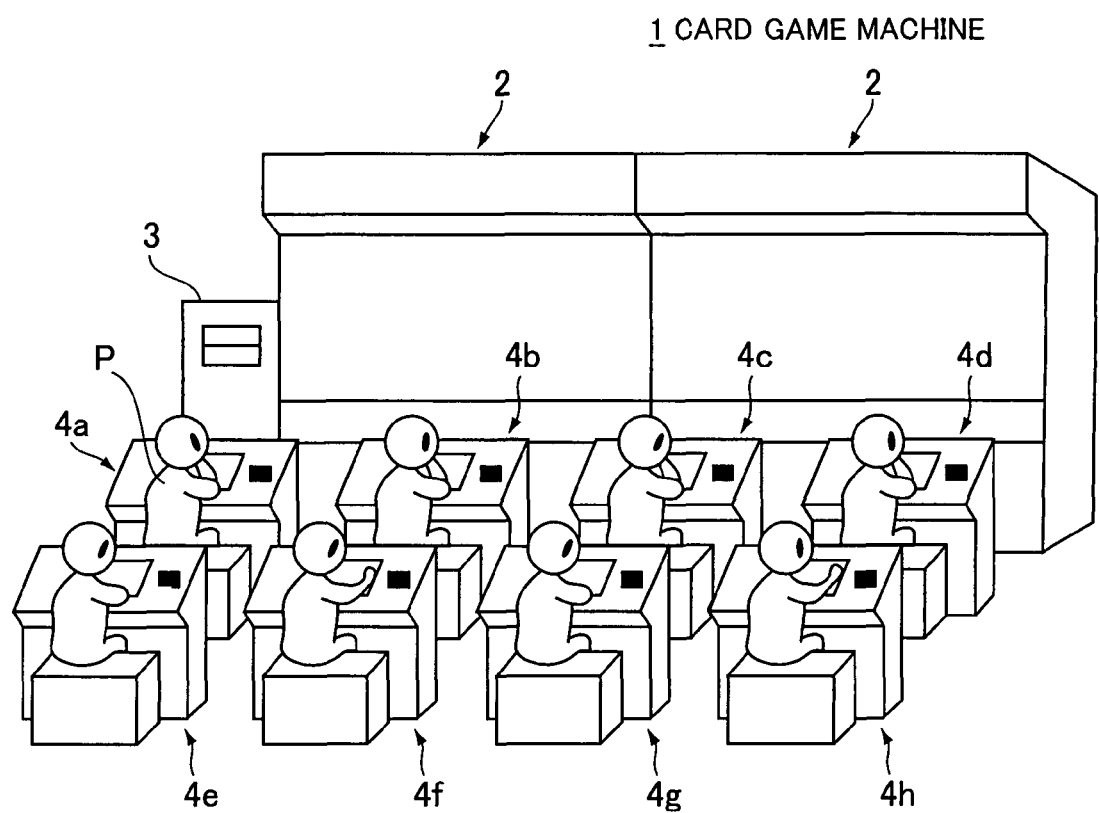
FIG. 1 is a perspective view illustrating the overall structure of one embodiment of a card game machine of the present invention.
Figure 2:
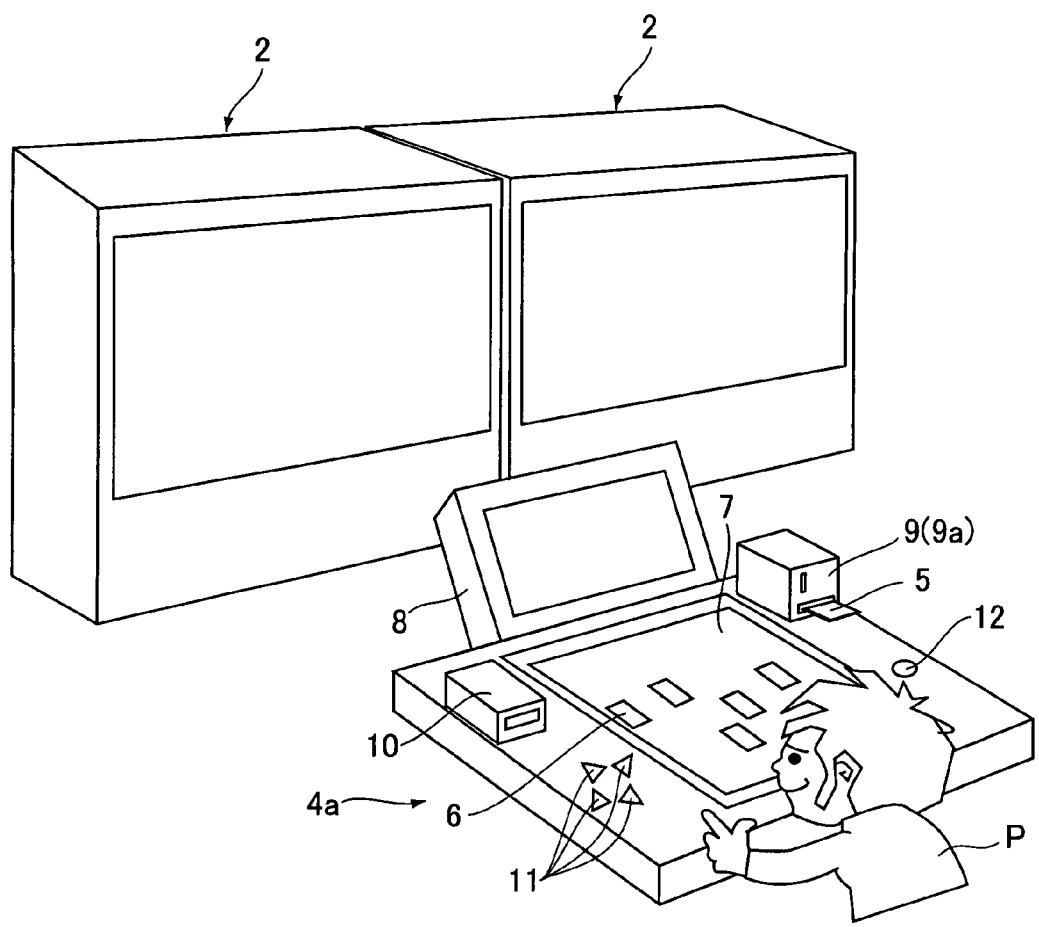
FIG. 2 is a perspective view illustrating a terminal device operated by each player in the card game machine shown in FIG. 1.

One embodiment of a card game machine, by way of example, of the present invention will be described below. FIG. 1 is a perspective view illustrating the overall structure of one embodiment of the card game machine of the present invention, and FIG. 2 is a perspective view illustrating a terminal device operated by each player in the card game machine. The embodiment described below is applied to a battle game set in a war-torn era, but the card game machine can also be applied to other card games including football simulation games.

As shown in FIG. 1 and FIG. 2, the card game machine 1 is made up of one or two large panel display(s) 2, a main controller 3 for the display control of the large panel display 2, and a plurality of terminal devices 4a to 4h which are connected in communication with the main controller 3. Each of the terminal devices 4a to 4h constitutes the game machine of the present invention.

The large panel display 2 displays a screen showing the current territorial alignments which change by the moment, an introduction of players who have successfully dominated the whole country as "previous emperors", and a ranking of the emperors, etc.

A player P who participates in a game for the first time purchases a starter kit first, which is necessary for playing the game, and sits at one of the terminal devices 4a to 4h. The starter kit includes an IC card 5 used as a recording medium for recording battle results and the like, and a plurality of cards 6 printed with illustrations of warlords or the like who lead respective troops. This card 6 serves as a play item, which forms part of the present invention, and the play item will be referred to as "card 6" in the following description.

On the IC card 5 is recorded player data, at least including the types of the cards 6 which the player owns, the qualities of the warlords or the like corresponding to card data recorded on the back side of the cards 6 such as "well-armed, good at charging", "intelligent, strategic", etc., previous battle results, and the name or nickname of the player. Thus, the card game machine 1 can obtain data necessary for the game by reading out the information recorded on the IC card 5, and verify that the player P is qualified to take part in the game.

The cards 6 have illustrations or the like of various different warlords printed thereon. On the back side of the cards 6 are recorded data patterns (code patterns) which form ID codes for identifying the warlords printed on the front side.

The terminal devices 4a to 4h are connected with communication lines and have the same structure; the description will be made with reference to the terminal device 4a shown in FIG. 2. The terminal device 4a includes a card placement panel 7 for placing cards 6 the player P owns thereon, a monitor 8 for displaying screens of a battle or the like, an IC card read/write device 9 in which the IC card 5 is inserted, a coin insertion device 9a, and a card issuing device 10 for giving out (issuing) new cards 6 to the player P per each game played. Each one of these terminal devices 4a to 4h constitutes the game machine of the present invention.

Players who operate these terminal devices (game machines) 4a to 4h can play a game with each other as competing opponents. Also, the player can play a game with the terminal device 4a or the like which he/she is operating as the opponent.

The coin insertion device 9a includes a coin slot and a sensor for identifying the inserted coins, and constitutes game fee collecting means for collecting the game fee when the player P starts a game. The coin insertion device 9a in FIG. 2 is united with the IC card read/write device 9, but they may be separated.

On the left side of the card placement panel 7, select buttons 11 for moving the cursor when inputting a name or selecting an item from a menu are provided. On the right side of the card placement panel 7, various button switches such as an action button 12 which is pressed for executing a "tactics", a "charge", or a "one-on-one fight", a start-up button, and the like are provided.

Figure 3:
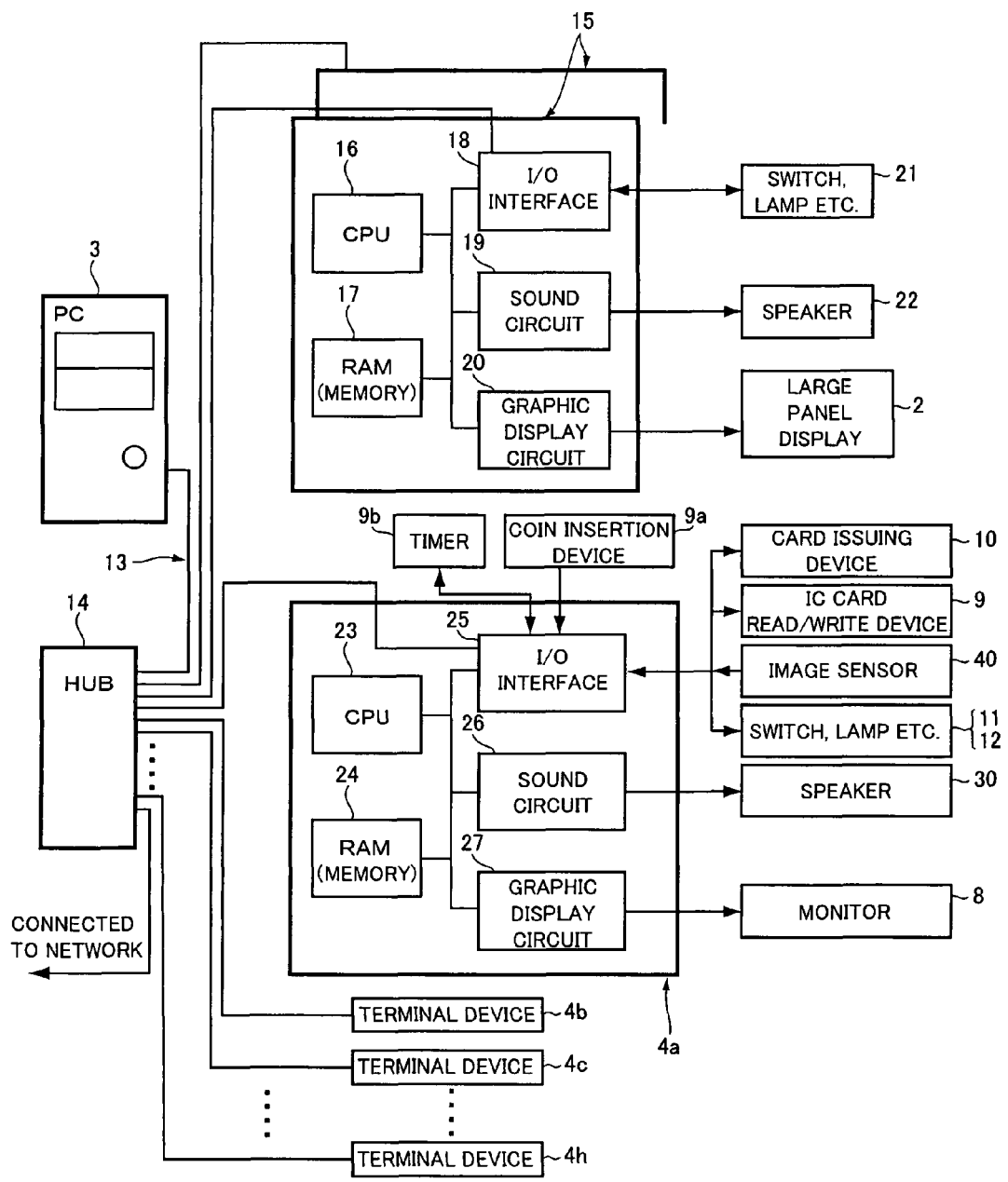
FIG. 3 is a control block diagram illustrating one example of the control system of the card game machine shown in FIG. 1.

FIG. 3 is a block diagram for explaining one example of the control system of the card game machine 1. The main controller 3 is connected through a hub 14 of a LAN (Local Area Network) 13 to a large panel controller 15 for the display control of the large panel display 2, to the terminal devices 4a to 4h, and to an external communication network (not shown). The terminal devices 4a to 4h are connected to each other through the hub 14.

The large panel controller 15 is made up of a control board or the like which includes a CPU 16, a RAM 17 which is a storage device (memory), an I/O interface 18, a sound circuit 19, and a graphic display circuit 20. The RAM 17 stores data of various images displayed on the large panel display 2, and an image output control program which selects these image data, determines a priority sequence, and displays the images in that sequence.

The I/O interface 18 is connected to the main controller 3 through the hub 14, and to switches 21 or the like for operating the large panel display 2. The sound circuit 19 is connected to a sound amplifier (speaker) 22 which outputs sound in accordance with various images shown on the large panel display 2. The RAM 17 also stores sound data and a sound output control program for outputting the sound data to the speaker 22. The graphic display circuit 20 displays an image selected by a control signal from the CPU 16 on the large panel display 2.

Each of the terminal devices 4a to 4h is made up of a control board or the like which includes a CPU 23, a RAM 24 (memory), an I/O interface 25, a sound circuit 26, and a graphic display circuit 27. The RAM 24 stores (records) data of various images shown on the monitor 8, an image output control program which controls the display of these image data, and a game control program which controls the progress of the game when a game is played with the card game machine 1.

The RAM 24 further stores battle data or the like which is used when the player P plays a game with the terminal device 4a or the like as the opponent. Recorded as the battle data are ID codes of various warlords who will be the enemies of the player P and their qualities.

The I/O interface 25 is connected to the main controller 3, as well as to the IC card read/write device 9, a coin sensor (not shown) of the coin insertion device 9a, a timer 9b, the card issuing device 10, the select buttons 11, the action button 12, and the switches or the like for operating the monitor 8, and to the image sensor 40 for reading out the card data on the back side of a card 6. The timer 9b is used as means for counting time which has passed, but a software timer which counts time with a program may also be employed.

The sound circuit 26 is connected to a sound amplifier (speaker) 30 which outputs sound in accordance with various images shown on the monitor 8. The RAM 24 also stores sound data and a sound output control program for outputting the sound data to the speaker 30. The graphic display circuit 27 displays an image selected by a control signal from the CPU 23 on the monitor 8.

Figure 4:
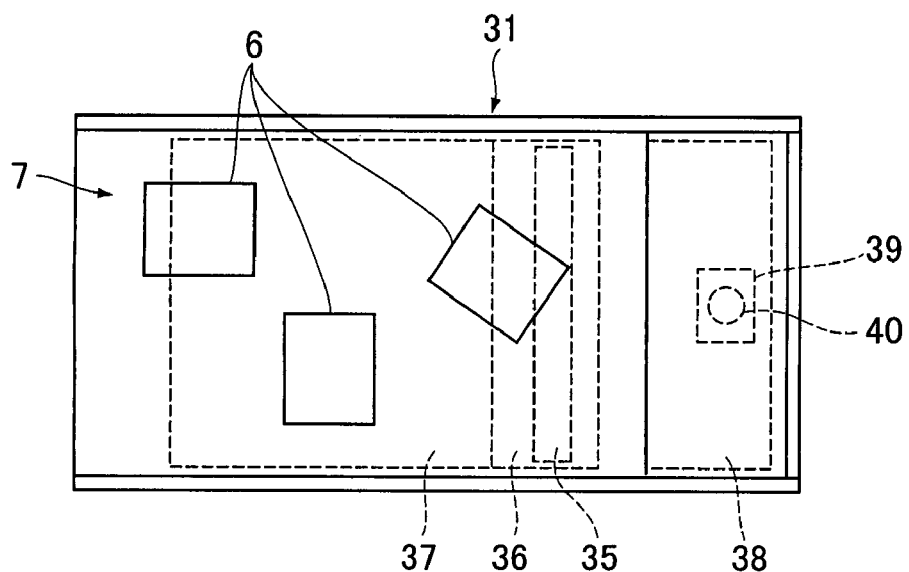
FIG. 4 is a plan view of a card placement panel provided in the card game machine shown in FIG. 2.
Figure 5:
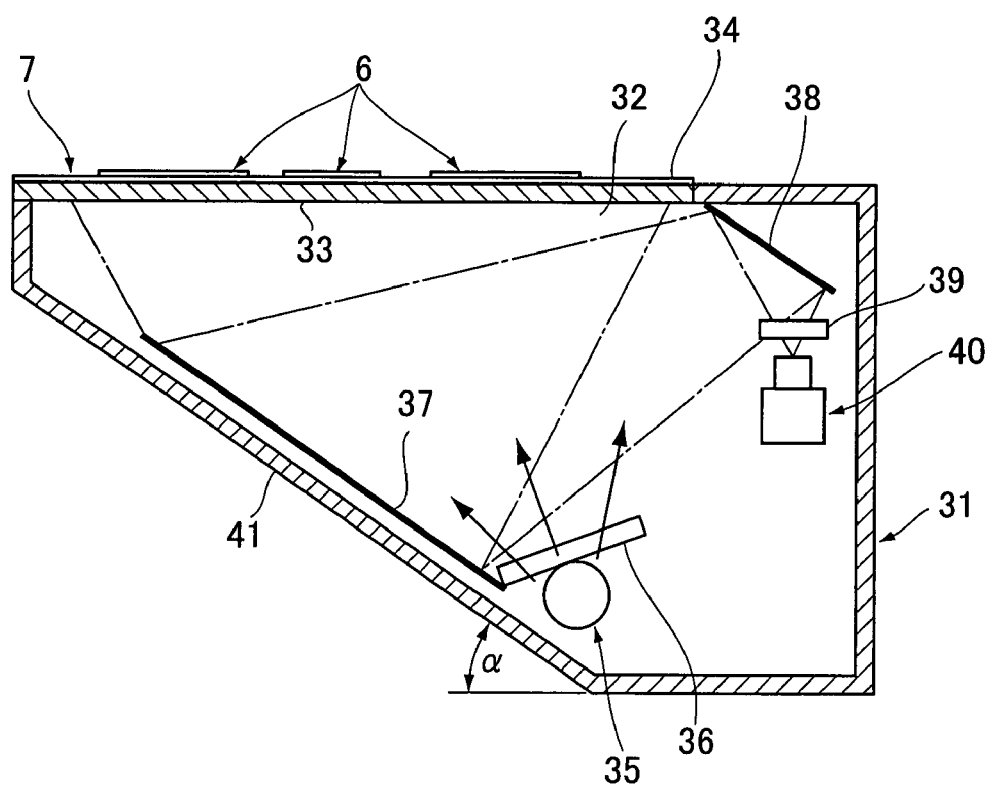
FIG. 5 is a longitudinal cross section of a housing on which the card placement panel is mounted.

FIG. 4 is a plan view of the card placement panel 7 shown from above, and FIG. 5 is a longitudinal cross section of a housing 31 in which the card placement panel 7 is mounted. As shown in FIG. 4 and FIG. 5, the card placement panel 7 is made up of a transparent glass plate 33 attached such as to close an upper face opening 32 of the housing 31, and a thin play field sheet 34 laid on top of the glass plate 33.

When playing a game, cards 6 are placed on the top face of this play field sheet 34. When the player P competes against another player who is operating another terminal device 4b, they place their cards 6 on the card placement panels 7 (play field sheets 34) of their respective terminal devices.

Inside the housing 31 are mounted a light source 35 for emitting infrared light (invisible light) toward the back side of the card 6 placed on the card placement panel 7; a first filter 36 for removing visible rays from the light emitted from the light source 35; a first reflection plate 37 for reflecting upwards the reflected light from the back side of the card 6; a second reflection plate 38 for reflecting downwards the reflected light (invisible light) from the first reflection plate 37; a second filter 39 for removing ambient light (visible light) from the light reflected from the second reflection plate 38; and an image sensor 40 for imaging the pattern of card data recorded on the back side of the card 6 which is placed on the card placement panel 7, using the reflected light which has passed through the second filter 39. The light source 35 is a light emitting diode (LED) or the like which emits invisible light such as infrared or ultraviolet rays, which cannot be seen by human eyes. If no visible light is emitted from the light source 35, the first filter 36 can be omitted.

The first reflection plate 37 is supported on a lower slope 41 of the housing 31 such that it is inclined at a predetermined angle ? relative to the horizontal card placement panel 7. The second reflection plate 38 is mounted at an angle which corresponds to the mounting angle of the first reflection plate 37.

Because of the lower slope 41 of the housing 31, the player P, when seated, can place his/her legs in the space below the slope 41. This allows the player P to stretch his/her arm to a farthest position on the card placement panel 7 when laying the cards 6 on the panel 7, enabling him/her to place the card 6 anywhere on the card placement panel 7. From inside the tightly closed housing 31 is projected infrared light (invisible light) from the light source 35, from which visible rays have been cut, onto the card placement panel 7, and therefore the card placement panel 7 cannot be seen through from above into the housing 31.

Figure 6:
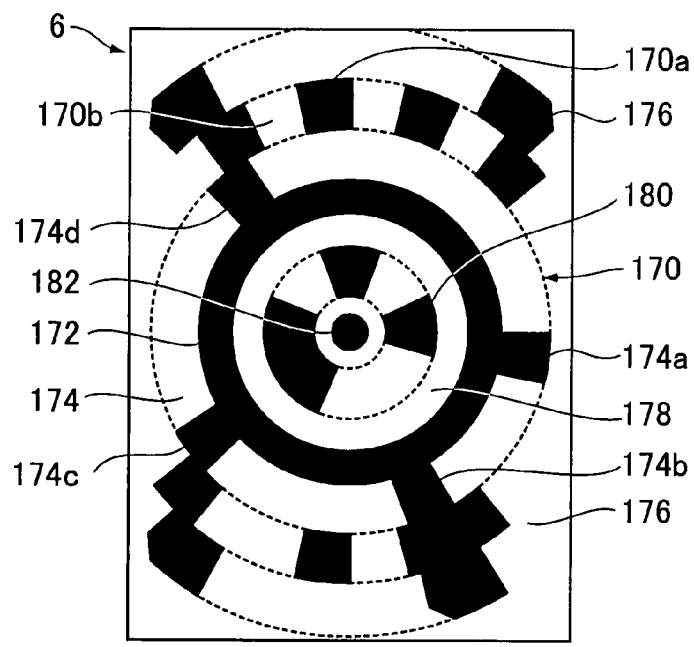
FIG. 6 is a diagram illustrating one example of a code pattern on the card.

FIG. 6 shows one example of a code pattern on the back side of the card 6. A code pattern 170, formed from various patterns with different radii, is printed on the back side of the card 6. The code pattern 170 includes a card position detection circle 172; an angle position detection pattern region 174 formed around the card position detection circle 172; an ID data region 176 formed around the angle position detection pattern region 174; an annular white region 178 formed inside the card position detection circle 172; a data region 180 formed inside the annular white region 178; and a center point 182 formed inside the data region 180. The code pattern 170 is identified by the difference in density between a black portion 170a and a white portion 170b.

The code pattern 170 is applied with a print using an ink which transmits infrared light, so that the player cannot directly see the code pattern. This prevents the player or other persons from tampering with the code pattern 170 to change the pattern or from fabricating a card with a forged code pattern.

The card position detection circle 172, the angle position detection pattern region 174, the ID data region 176, the annular white region 178, and the data region 180 of the code pattern 170 are concentric circles around the center point 182, and the ID data region 176 is formed in an arc-shape, because its radius is larger than the short side of the card 6. That is, the ID data region 176 is the outermost circular pattern and since this circle has a larger radius than the short side of the rectangular card, it is partly provided as an arc, so as to use the entire surface of the card efficiently.

Figure 7:
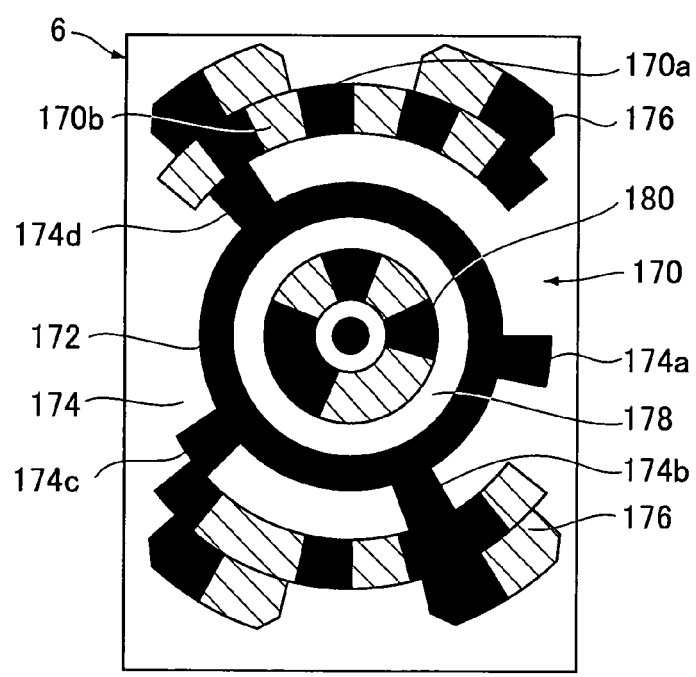
FIG. 7 is a diagram illustrating one example of an image of the back side of a card taken by an image sensor.

FIG. 7 shows one example of an image of the back side of the card 6 taken by the image sensor 40. As shown in FIG. 7, when the code pattern 170 is imaged by the image sensor 40, a black-white portion is identified as "1" and a white-black portion as "0". The white portions of the ID data region 176 and the data region 180 are provided with hatching; they are not blanks but indicate some information as combinations with black portions. That is, the black portion and the white portion mentioned above form a 1-bit signal, and these black portions and white portions are arranged indifferent patterns in accordance with the preset contents of information, these position patterns functioning as the code pattern. In this example, the size of one half bit (one black portion or one white portion) corresponds to six dots of the image data imaged by the image sensor 40 when displayed on the screen.

The code pattern 170 and the center point 182 of the card 6 are detected based on the difference in brightness between the inner side and the outer side of the card position detection circle 172. Annular white regions are therefore formed inside and outside of the card position detection circle 172 so as to make the difference in brightness clear between the inner and outer circumferences of the circle 172. Being a circle, the card position detection circle 172 enables detection of the position irrespective of the orientation (angle position) of the card 6.

The angle position of the code pattern 170 (orientation of the card 6) is determined by detecting circumferential distances between protrusions 174a to 174d in the angle position detection pattern region 174 which extend radially outwards from the outer circumference of the card position detection circle 172. Therefore, the protrusions 174a to 174d are not equally but differently distanced around the circle, so that the angle position of the card 6 can be determined by detecting the different distances.

The value of each bit is determined from the difference in brightness between two adjacent half bit regions. When determining the brightness of each region, the brightness in the center of each region is used and not the brightness at the edge of the interface between the adjacent regions, so as to minimize the effect of defocusing or positional/angular misalignment.

Figure 8:
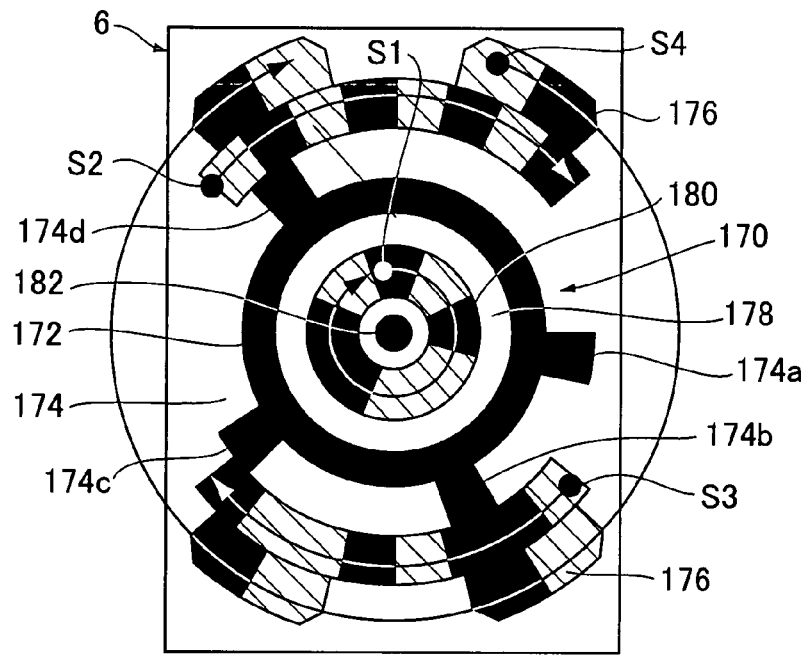
FIG. 8 is a diagram illustrating the starting positions of the bits in the ID data region recorded on the back side of a card as well as the data region.
Figure 9:
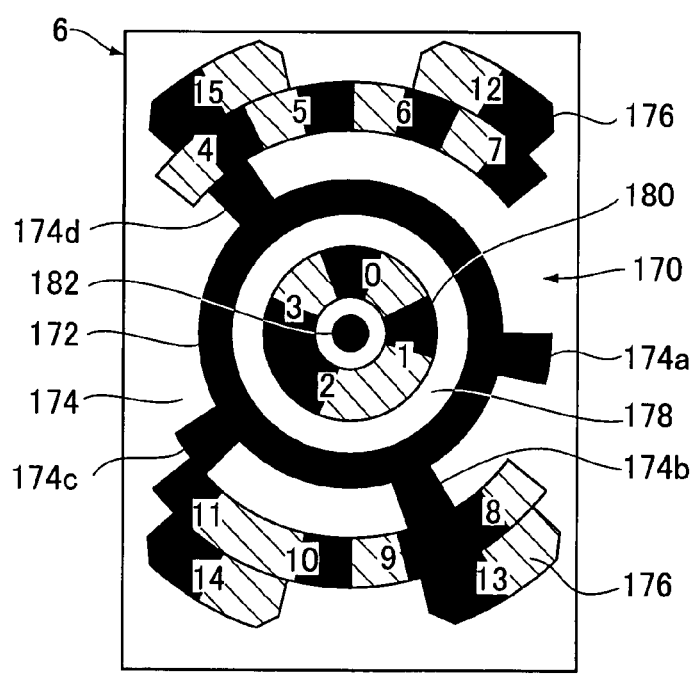
FIG. 9 is a diagram illustrating a pattern data arrangement on the back side of a card.

As shown in FIG. 8, each card 6 has a different bit start position S1 to S4 in the ID data region 176 and the data region 180. As shown in FIG. 9, 16-bit information made up of patterned data 0 to 15 is available from the ID data region 176 and the data region 180. Each patterned data 0 to 15 includes a black portion and a white portion as described above, and each black-and-white portion has a relatively large area so that it is easily recognizable from the image data taken by the image sensor 40 so as to prevent a data read error.

Figure 10:
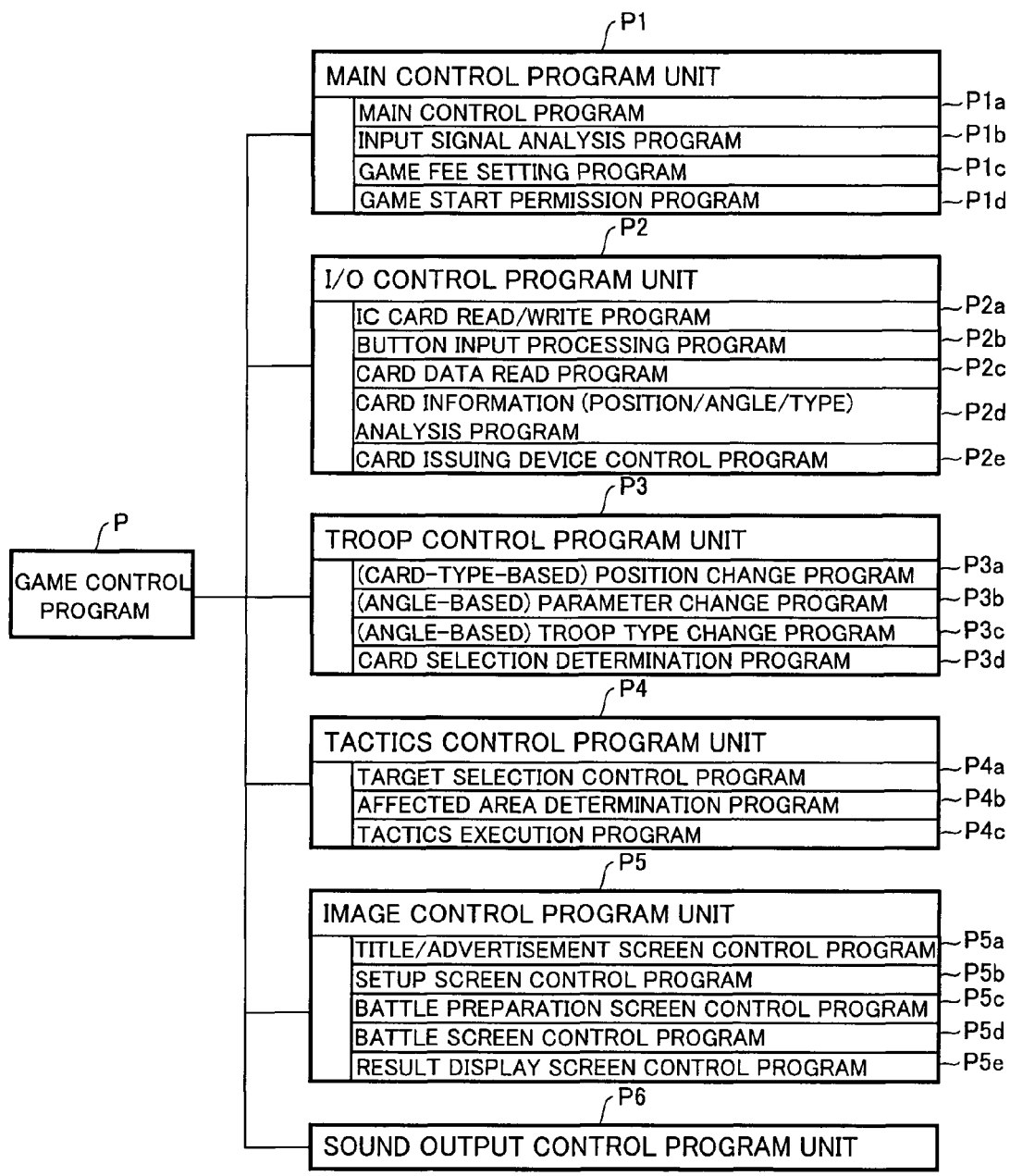
FIG. 10 is a diagram for explaining the configuration of a software provided in the card game machine shown in FIG. 2.

Next, the configuration of the software stored in the RAM 24 of each terminal device 4a to 4h shown in FIG. 1 to FIG. 3 for controlling the operation of the card game machine 1 will be described. FIG. 10 shows one example of the configuration of the program which controls the operation of the card game machine 1.

As shown in FIG. 10, the game control program which controls the operation of the card game machine 1 is made up of a main control program unit P1; an I/O control program unit P2; a troop control program unit P3; a tactics control program unit P4; an image control program unit P5; and a sound output control program unit P6. This game control program constitutes the game control means of the present invention.

The main control program unit P1 is configured with a program which controls the overall operation of the card game machine 1 of the present invention, and sub-programs necessary for this overall control. The main control program unit P1 includes several sub-programs such as a main control program P1a, an input signal analysis program P1b, a game fee setting program P1c, and a game start permission program P1d.

The main control program P1a is executed after the power of the card game machine 1 is turned on and controls the whole process of a game. The main control program P1a also includes an initialization program which initializes memory regions of the RAM 24, which are provided for storing variables used in the program, and which displays a start-up screen on the monitor 8 when the power of the card game machine 1 is turned on. The main control program P1a also includes a communication control program for data communication with other terminal devices 4b or the like when the player P competes with another player who is operating one of the other terminal devices 4b or the like.

The input signal analysis program P1b is a program for analyzing a signal (such as an interrupt signal) inputted from the IC card read/write device 9, coin insertion device 9a, image sensor 40, select buttons 11, action button 12 and others, and for allocating a sub-program to necessary processing.

The game fee setting program P1c is a program for setting a fee per one game when a player P plays a game, and constitutes game fee setting means. According to the present invention, when the player P wins one game, he/she is given the right to try another game successively (post-victory bonus game), a choice being given to the player whether he/she wishes to try or not. If the player P chooses to try the post-victory bonus game, the game fee is set lower than a normal fee. According to the present invention, if the player wins the first post-victory bonus game, he/she can further try a second post-victory bonus game. The game fee for the second post-victory bonus game is also set lower. The game fee setting program P1c thus sets (determines) the fee for a game after the game in which the player has won, in accordance with the number of consecutive wins.

The game start permission program P1d is a program which counts and stores the amount (number) of coins inserted in the coin insertion device 9a by the player P. That is, the program recognizes the number of inserted coins as the number of stored coins which can be allocated to the game fee, and determines whether or not the amount of stored coins covers the game fee (credit) of one game. The program then gives permission to start the game when it has determined that the amount of stored coins (number of inserted coins) covers the fee for the game. If the amount of coins fails to cover the fee, the program displays a number of coins which need to be inserted on the monitor 8.

Although not shown in FIG. 10, the main control program unit P1 also includes a match-up program which is a control program for allowing the player P to play a game with the terminal device which he/she is operating as his/her opponent.

The I/O control program unit P2 is made up of a program which executes necessary processing based on an input signal from the above-mentioned various button switches, and an input device or a sensor of the IC card read/write device 9 which are connected to the I/O interface 25; and a program which controls output to the IC card read/write device 9, the card issuing device 10 and others. As shown in FIG. 10, the I/O control program unit P2 includes several sub-programs such as an IC card read/write program P2a, a button input processing program P2b, a card data read program P2c, a card information (position/angle/type) analysis program P2d, and a card issuing device control program P2e.

The IC card read/write program P2a is a program which controls the operation of the IC card read/write device 9, such as reading the data recorded on an IC card 5 owned by a player P when he plays a game and storing such data in the RAM 24, and writing data on game results or battle results on the IC card 5. The button input processing program P2b is a program which executes processing in accordance with an input signal from the select buttons 11, action button 12, and others.

The card data read program P2c decodes image data which is obtained by imaging a code pattern 170 printed on the back side of a card 6 with the image sensor 40, when the player P places the card 6 on the card placement panel 7 (play field sheet 34) to start a game, and stores the decoded data in the RAM 24. The card information (position/angle/type) analysis program P2d is a program which analyzes the position, angle, and the like of a card 6 placed on the play field sheet 34, and stores the analysis data in the RAM 24. The card issuing device control program P2e is a program which controls issuance of a predetermined number of new cards 6 to a player P based on the control of the main control program unit P1, and, with the card issuing device 10, it constitutes play item issuing means of the present invention.

The troop control program unit P3 and the tactics control program unit P4 are programs which control the operation in battle scenes of the game, when the player P moves a card 6 on the card placement panel 7 to perform an attack or the like, and which control display of battle scenes on the monitor 8.

The troop control program unit P3 is a program which controls the troop represented by a card 6 based on the card information recorded on the card 6. The troop control program unit P3 includes various sub-programs such as a (card-type-based) position change program P3a which changes the position of the troop by the type of the card in accordance with the position of the card 6; an (angle-based) parameter change program P3b which changes the parameters such as attack force, firing range, and defense force of the troop in accordance with the angle of the card 6; an (angle-based) troop type change program P3c which changes the type of the troop such as an army of spear carriers or archery squads in accordance with the angle (portrait-oriented or landscape-oriented, etc.) of the card 6; and a card selection determination program P3d which determines that a troop represented by a card 6 has been selected based on a detected change in position of the card 6 when the player P moves the card 6 on the card placement panel 7 in a sliding manner.

The tactics control program unit P4 is a program which controls tactics such as firing tactics to give damage to the opponent in accordance with the card information recorded on the card 6 and the player's operation of the action button 12. The tactics control program unit P4 includes several sub-programs such as a target selection control program P4a which displays goals of the tactics in accordance with the angle of the card 6 for the player P to select, when the troop which corresponds to the card 6 selected by the card selection determination program P3*d* mentioned above is in a condition to use the tactics (when the troop morale is more than a predetermined level); an affected area determination program P4*b* which determines the area affected by the tactics; and a tactics execution program P4*c* which executes the tactics and reproduces the damage inflicted upon the opponent. The tactics execution program P4*c* also includes a program which constitutes game outcome determination means for determining the outcome of the game.

The image control program unit P5 is configured with a program for outputting various staged images on the monitor 8 based on the control of various programs such as the main control program unit P1, the troop control program unit P3, and the tactics control program unit P4. The image control program unit P5 includes various sub-programs such as a title/advertisement screen control program P5*a*, a setup screen control program P5*b*, a battle preparation screen control program P5*c*, a battle screen control program P5*d*, and a result display screen control program P5*e*.

The title/advertisement screen control program P5*a* is a program which controls the display of the title of the game and advertisements and the like when a game is started by the control of the main control program P1*a*. The setup screen control program P5*b* is a program which controls the display of setup screens such as a mode selection screen, a card registration screen, a strategy selection screen, a continent display screen for matching up opponents, a battle result screen, a ranking screen in accordance with the battle results, and a conquest screen.

The battle preparation screen control program P5*c* is a program which controls display of battle preparation screens such as an opponent introduction screen and a card placement screen. The battle screen control program P5*d* is a program which controls display of battle screens, and the result display screen control program P5*e* is a program which controls display of a screen which shows experience points obtained in accordance with the battle results, a battle result review screen, and a card issuance screen for notifying (reporting) the player P of the issuance of a new card.

The sound output control program unit P6 is a program for outputting sound from the speaker 30 based on the control by the main control program unit P1, the troop control program unit P3, and the tactics control program unit P4.

These programs noted above can be developed using a program developing language such as the C language. Source programs developed using the C language or the like are translated into object programs (of the machine language) which can be executed in the CPU 23, and these programs are stored in a CD-ROM, a DVD-ROM, or an external memory device such as a hard disk device of the terminal device 4*a*. Various image data and sound data are also stored in a recording medium which can be read by a computer. When the power of the terminal device 4*a* is turned on, and a CD-ROM or a DVD-ROM, for example, on which the above-noted programs are stored, is set in a reading device of the terminal device 4*a*, these programs and image/sound data are read into the RAM 24, whereby the card game can be executed.

The recording medium which can be read by a computer mentioned above may be a mask ROM, which reads recorded data electrically. When such a mask ROM is used, the control board in the terminal device 4*a* shown in FIG. 3 is provided with a control circuit on which this mask ROM is mounted, and the object programs mentioned above are stored in this mask ROM.

Figure 11:
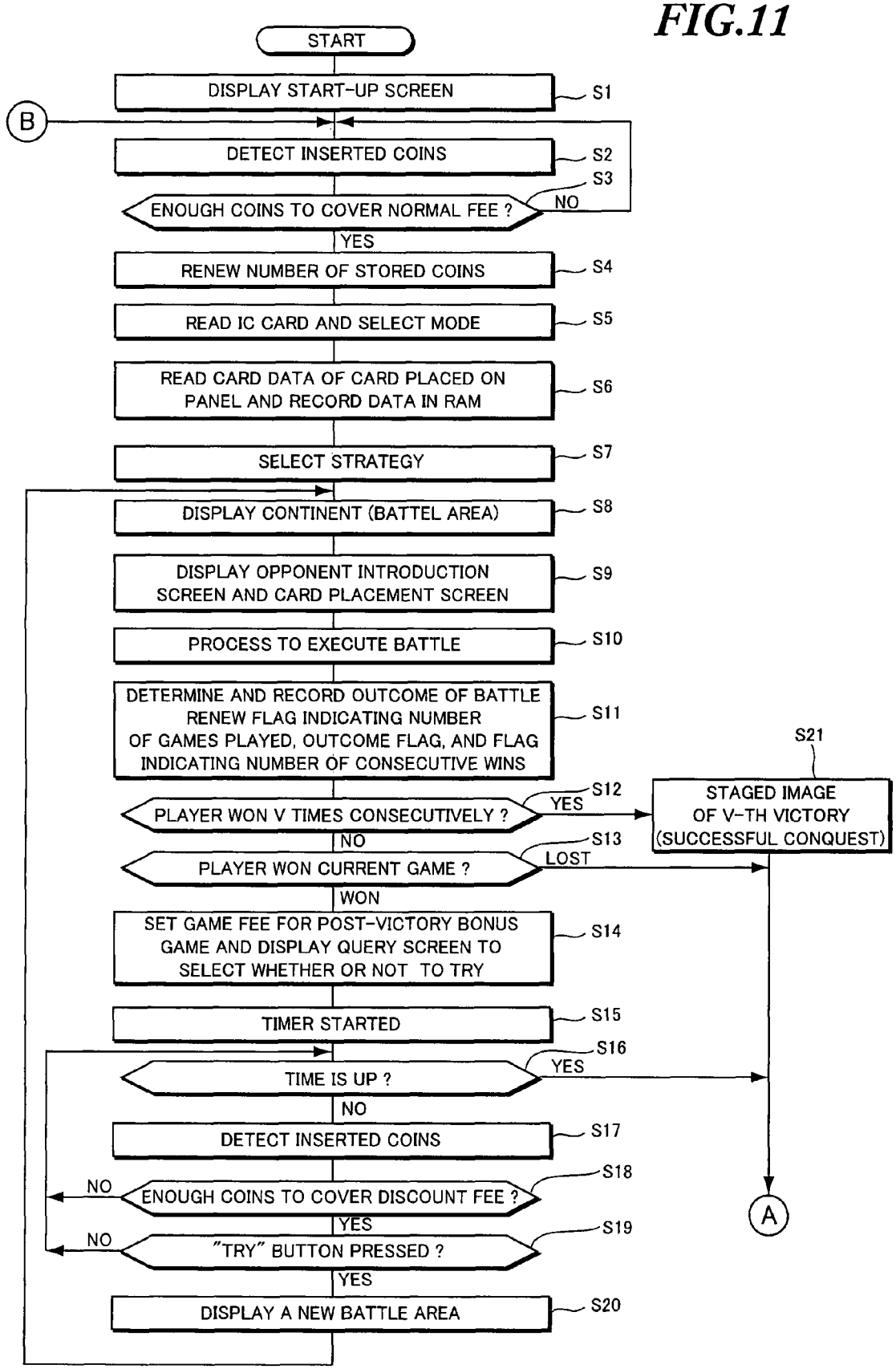
FIG. 11 is a flowchart for explaining the process steps of a program which controls the operation of the card game machine shown in FIG. 2.

Next, the game method and the software processing of one embodiment of the card game machine 1 of the present invention will be described with reference to the flowcharts of FIG. 11 and FIG. 12. When a player P plays a game with the card game machine 1 for the first time, he/she needs to purchase a starter kit from a vending machine or the like in an amusement arcade or the like. A starter kit includes a plurality of cards 6 printed with illustrations of warlords or the like who lead respective combat troops used in the game, and one IC card 5 having a built-in IC chip. On the IC card 5 is preliminarily stored the characteristics data of combat troops represented by the cards 6 as mentioned above, and battle results of each game are also stored in the IC card 5.

First, when the terminal device 4*a* is turned on, the various programs stored in a CD-ROM or the like and shown in FIG. 10 and image/sound data are read into the RAM 24, and the main control program P1*a* is started and initializes the memory region in the RAM 24 where variables are stored (a flag indicating the number of games played, a flag indicating the number of consecutive wins, and an outcome flag as will be described later).

The process steps of the game control program will be described below in the order of the steps shown in FIGS. 11 and 12.

(Step S1)

In step S1, the main control program P1*a* activates the title/advertisement screen control program P5*a* so as to display the title or the like of the card game on the monitor 8. The card game machine 1 then waits for the player P to insert coins to play a game.

(Steps S2 and S3)

When the player P throws coins into the coin insertion device 9*a*, the coin sensor installed inside the coin insertion device 9*a* detects the inserted coins, and inputs a detection signal to the terminal device 4*a* via the I/O interface 25. The input signal analysis program P1*b* of the terminal device 4*a* examines the type of the input signal, and when it recognizes the signal as a coin insertion signal, the program activates the game start permission program P1*d*.

The game start permission program P1*d* gives permission (access) to play a game: That is, the program P1*d* counts the amount (number) of coins the player P has thrown into the coin insertion device 9*a* and stores the amount as a number of inserted coins in a memory region set in the RAM 24; adds the number of inserted coins in a region set in the RAM 24 provided for recognizing the amount of stored coins; and decides whether the amount of stored coins covers the fee (credit) for one game in step 3. If the program determines that the amount of stored coins covers the fee for one game, it gives permission to play the game, and the process goes to the next step S4. If the amount of inserted coins does not cover the credit, the process goes back to step S2.

According to the present invention, the game fee when a player P plays the game for the first time is a normal rate of, for example, three coins.

Also, according to the present invention, when the player P plays the game and obtains a "victory" and tries the next "post-victory bonus game," the fee for this post-victory bonus game is reduced to two coins. If the player P wins this first post-victory bonus game, and tries a second post-victory bonus game, the game fee this time will be one coin. Thus, when the player P obtains a series of victories (consecutive wins), the game fee for a game after the game in which the player has won is set at a discount rate in accordance with the number of consecutive wins, until the number of consecutive wins reaches a predetermined number. If the player P plays a game and loses it, the normal fee mentioned above is applied to the fee for a next game. Therefore, in step S3, the normal rate is applied to the game fee.
(Step S4)

As the amount of stored coins covers the fee for one game, the game start permission program P1d deduces the number of coins corresponding to the credit of the game which is going to be played from the amount of stored coins stored in the RAM 24, and stores the new amount of stored coins obtained by the deduction in the RAM 24. This processing is performed for allocating any remaining coins to the fee for a next game, in the event that the player P may have inserted more coins than necessary for the normal fee.
(Step S5)

Next, the player P inserts his/her IC card 5 into the IC card read/write device 9. When a signal indicating insertion of an IC card 5 is inputted, the main control program P1a activates the IC card read/write program P2a to store the information recorded on the IC card 5 into the RAM 24. The program then displays a mode selection screen for the game on the monitor 8 and allows the player P to select a mode of the game to be played. This game mode selection is a selection of whether the player wishes to play a match game with another player operating one of the other terminal devices 4b or the like as the opponent, or to play a game alone with the terminal device 4a (computer) he/she is seated at as the opponent. The main control program P1a performs processing as required in accordance with the selected mode.
(Step S6)

In step S6, when the player P places a card 6 on the card placement panel 7, the main control program P1a activates the card data read program P2c to record the data on the code pattern 170 stored (printed) on the back side of the card 6 in the RAM 24. The reading of this code pattern 170 is performed by the image sensor 40 as described above, and the analysis of read data such as gray image data is performed by the card data read program P2c. In the code pattern 170 is recorded data for each type of troops and the like as mentioned before.
(Steps S7 and S8)

In step S7, the main control program P1a activates the setup screen control program P5b to display a screen on the monitor 8 which allows the player P to select a strategy to be used in the battle, and stores the strategy selected by the player P in the RAM 24. Next, in step S8, the setup screen control program P5b displays a battle area in a war-torn continent where the battle will take place in the game for a preset period of time.
(Step S9)

In step S9, the battle preparation screen control program P5c displays a screen on the monitor 8, which introduces the warlord or the like whom the player P is going to fight a battle against. If the opponent of the player P is another player who is operating another terminal device 4b (to 4h), the information regarding the card 6 placed on the card placement panel 7 of the terminal device 4b is transmitted to the terminal device 4a of the player P, and displayed on the monitor 8. If the player P has chosen the terminal device 4a as his/her opponent, then the main control program P1a selects one of the warlords recorded in the RAM 24 and sets the same as the opponent of the player P to fight against.

Next, the battle preparation screen control program P5c displays a card placement screen on the monitor 8, in which the cards 6 which will be used in the battle by the player P are arranged as placed on the card placement panel 7.

Figure 13:
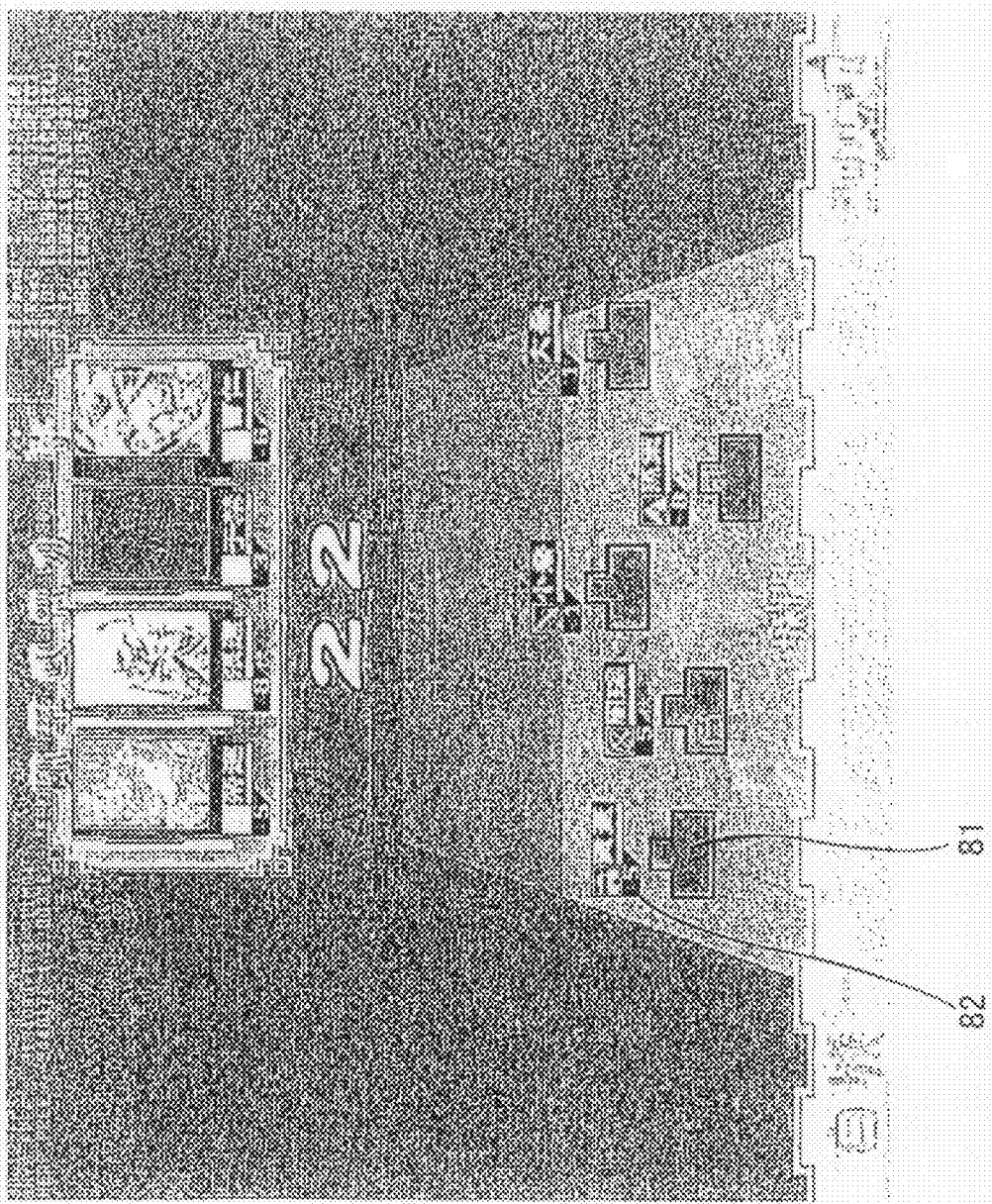
FIG. 13 is a diagram illustrating one example of a card placement screen.

FIG. 13 shows one example of the card placement screen mentioned above. As shown in FIG. 13, in the image, in which the player's fort is positioned on the front side (lower part of the screen) and the enemy's fort is positioned on the farther side (upper part of the screen), outlines 81 of troops and captions 82 including their icons, names, and characteristics are displayed in accordance with the positions of the placed cards 6. FIG. 13 indicates that the player P has placed five cards 6 on the card placement panel 7.
(Step S10)

Figure 14:
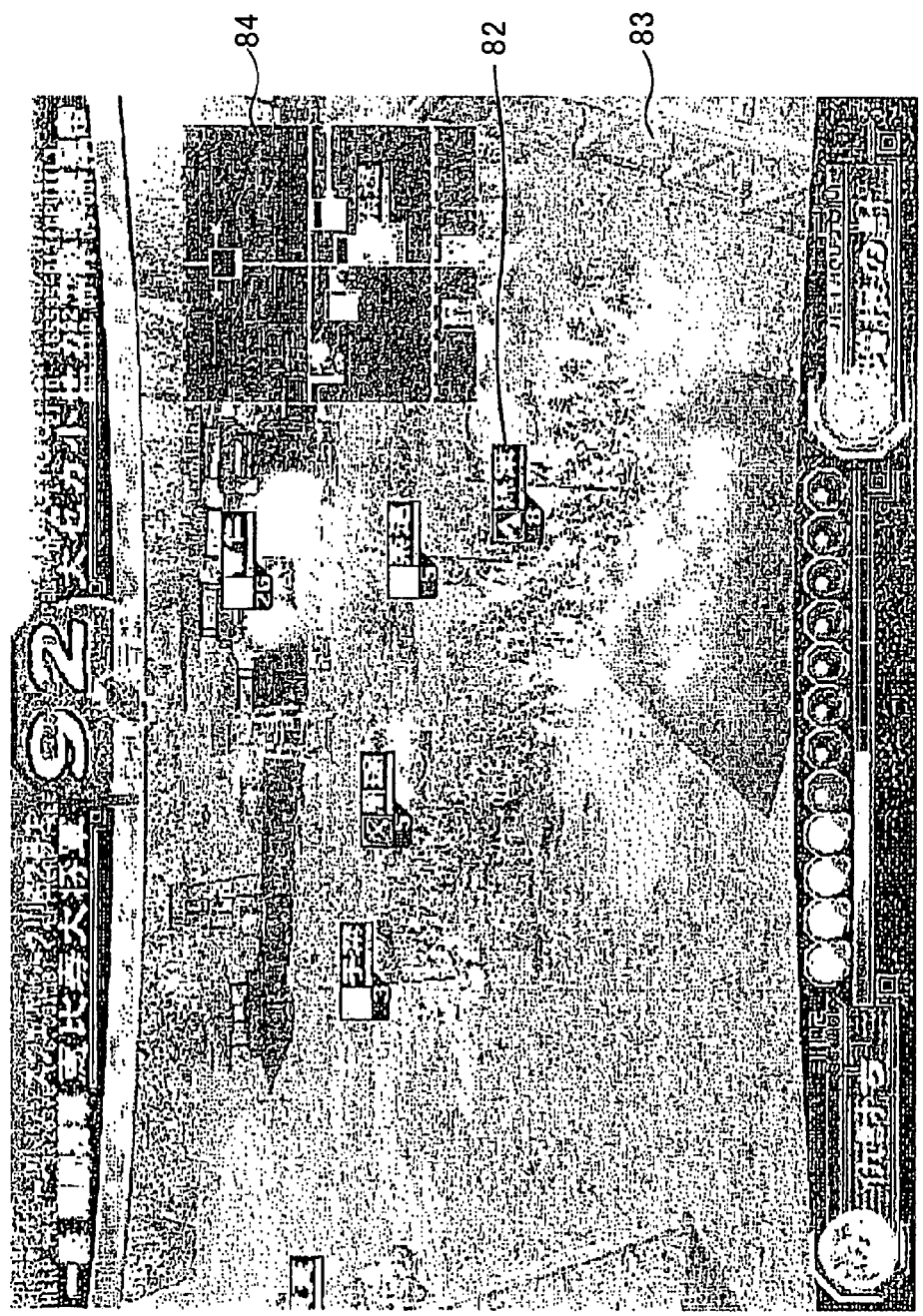
FIG. 14 is a diagram illustrating one example of a battle screen.

Next, when the player P moves a card 6 on the card placement panel 7 in a sliding manner, the battle is started, and the battle screen control program P5d displays a battle screen shown in FIG. 14 on the monitor 8. The main screen 83 shown in FIG. 14 shows a zoomed-in image of the battle situation including images of soldiers of the troop represented by the card 6 with the caption 82 which indicates the troop. In a sub-screen 84 is displayed the deployment of all the cards (troops) 6 in the entire battle area. During the display of the battle screen, the sound output control program unit P6 outputs sounds and sound effects from the speaker 30 to imitate the atmosphere of combat at each stage. The battle is fought against the enemy's troops and the outcome is determined in accordance with the processing of the troop control program unit P3 and the tactics control program unit P4.

If the opponent of the player P is another player who is operating another terminal device 4b or the like, when the player P moves a card 6 on the card placement panel 7 in a sliding manner, data on that movement and the like is transmitted to the opponent's terminal device and displayed as a battle screen on the monitor 8.
(Step S11)

The tactics execution program P4c determines the outcome of the battle game which has been fought using the cards 6 in step S10 as described above, and records data on the battle results including the outcome of the battle in the RAM 24. The outcome of the battle game is determined, for example, in the following manner.

A hundred hit points, for example, are given to the player P and his/her opponent at the start of the battle, and the values of the hit points are displayed on the game screen. As the player moves around the cards 6 to attack the enemies into their fort and gives damage to the opponent's troops, the hit points of the opponent decrease in accordance with predetermined rules. This way, one of the players whose hit points have reached zero first loses the game. If their hit points have reached zero at the same time, both of the player P and his opponent lose the game. Or, as time is counted down after the start of the battle, the player who has more hit points when time is up is determined to be the winner, and if the hit points are the same (draw), both of the players are determined to have lost the game.

In step S11, too, as means of counting the number of games played by the player P, a "1" is added to a region in the RAM 24 (hereinafter a "flag indicating the number of games played").

Furthermore, if the tactics execution program P4c determines that the player P has obtained a victory, a "1" is added to a region in the RAM 24, as means of counting the number of consecutive wins (hereinafter a "flag indicating the number of consecutive wins"). Also, as means of recording the outcome of each game, the outcome of each game is recorded in a region in the RAM 24 (hereinafter "outcome flag"). For example, a "2" for a win, and a "1" for a loss, is stored in the outcome flag.
(Steps S12 and S21)

In step S12, the main control program P1a determines whether or not the value of the flag indicating the number of consecutive wins recorded in the RAM 24 has reached a predetermined upper limit V of, for example, 3. That the number of consecutive wins has reached the upper limit V means that the player P has put down (conquered) the entire continent, i.e., fully cleared the game. If the number of consecutive wins has reached V, the process goes to step S21, where the setup screen control program P5b displays a screen which presents a successful conquest on the monitor 8 for a preset period of time, after which the process goes on to step S22.

(Step S13)

Figure 12:
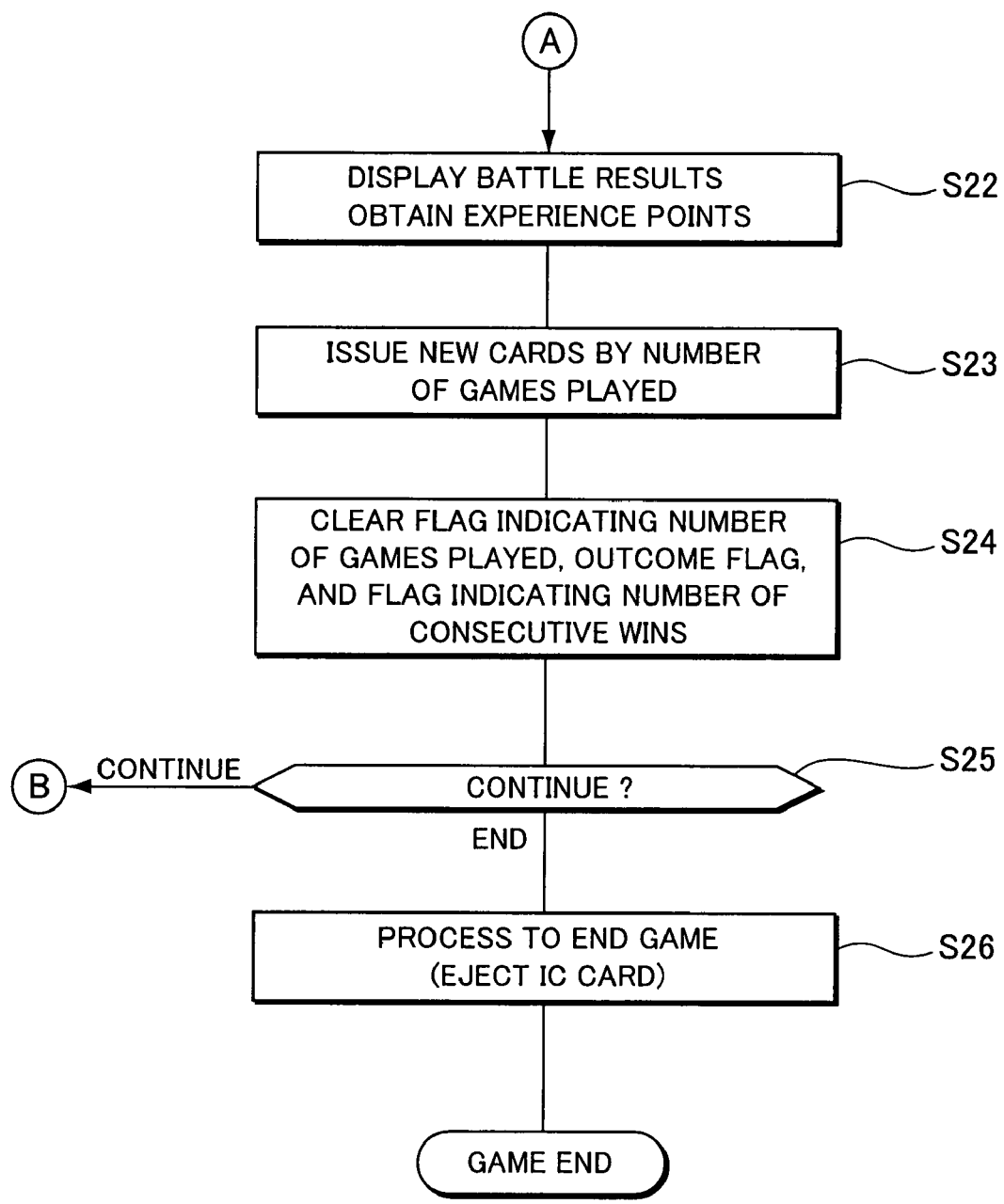
FIG. 12 is a flowchart for explaining further process steps of the game control program shown in FIG. 11.

In step S13, the main control program P1a determines whether the player P has won or lost the game which has been played, and if the player has won, the process goes to the next step S14, and if the player has lost, the process goes to step S22 (see FIG. 12). Whether the player P has won or lost the current game can be determined by referring to the outcome flag stored in the RAM 24 in step S11.

(Step S14)

As it has been determined that the player P has obtained a victory in the current game in step S13, processing is done to display a staged image of the player's victory, as well as a query screen asking the player P whether or not he/she wishes to try a next game (post-victory bonus game), on the monitor 8. This "post-victory bonus game" means that, when the player P wins a game and tries another game, the fee for the next game is set lower than the normal fee, as described above. In the post-victory bonus game, a game screen with a combat scene in a different battle area (region) may be displayed, and the challenge level for obtaining a victory may be set changeable. The staged image of the player's victory may be for example an image of the enemy's fort being destroyed, which is displayed for a preset period of time, this being done by the main control program P1a activating the setup screen control program P5b.

Figure 15:
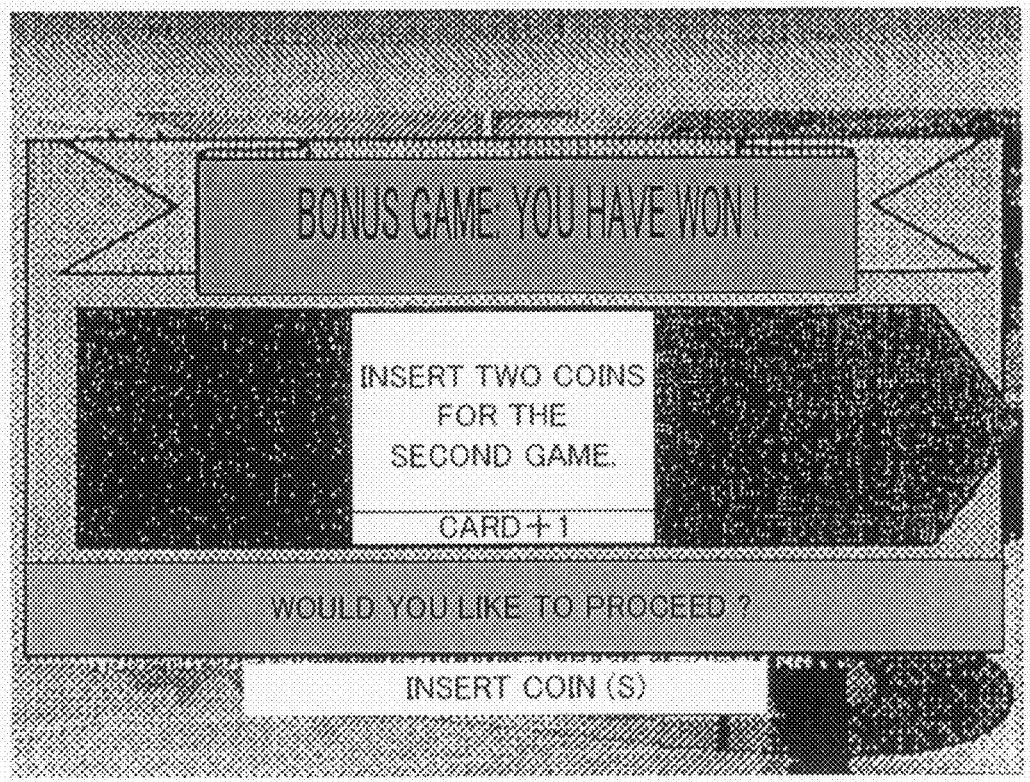
FIG. 15 is a diagram illustrating one example of a screen asking whether or not to try a post-victory bonus game.

Next, in step S14, the setup screen control program P5b displays a screen which notifies the player P of the fact that he/she has obtained the right to try the post-victory bonus game and which asks him/her whether or not he/she wishes to try the post-victory bonus game, as shown in FIG. 15. This notification may be given to the player P with a sound.

The main control program P1a controls such that, when displaying the screen shown in FIG. 15, it is also displayed how many times it is that the player P has won and tries a next post-victory bonus game, and the fee (number of coins) for the game. The example shown in FIG. 15 indicates that the player has won once and may try the game for a second time (first post-victory bonus game), and that the player needs two coins to play the game. The game fee for trying this post-victory bonus game is set at a discount rate in accordance with the number of consecutive wins which the player P has obtained, as described above. This discount rate may be set in a following manner by the game fee setting program P1c.

In the game fee setting program P1c are preliminarily registered constants representing the numbers of coins (credit) necessary for playing a game after the game in which the player has won, i.e., a post-victory bonus game, for each number of consecutive wins R (=0, 1, 2, . . . V−1). For example, a data table such as the one shown in Table 1 is registered in the game fee setting program P1c: In this case, the game fee is set lower until the third time, i.e., until he/she has won twice consecutively and tries a third game (second post-victory bonus game). The data table shown in Table 1 is a constant table defining the fee (number of coins) for a next game for each different number of consecutive wins R.

TABLE 1

| Consecutive wins (R) | Game fee per one game (number of coins) |
|---|---|
| 0 | 3 (normal fee) |
| 1 | 2 |
| 2 | 1 |

Referring to Table 1, if the number of consecutive wins R is 0 (R=0), it means that the player P plays the game for the first time, or plays a game after he/she has lost the previous game, and the credit or the game fee will be three coins, which is the normal fee. If the number of consecutive wins R is 1 (R=1), it means that the player P has won once, and if he/she tries the next post-victory bonus game, the credit will be two coins. If he/she wins for a second time (R=2) and tries the second post-victory bonus game, then the credit will be one coin.

This way, the game fee setting program P1c determines a discount fee for a post-victory bonus game which is going to be played next in accordance with the number of consecutive wins previously obtained, by using the flag value indicating the current number of consecutive wins stored in the RAM 24 and by referring to the data table shown in Table 1. The number of coins thus determined is displayed as shown in FIG. 15, by the processing made by the setup screen control program P5b.

Instead of storing such a data table as shown in Table 1 in the program, alternative program means for determining the fee for a post-victory bonus game is to provide the game fee setting program P1c with means for determining the flag value which indicates the number of consecutive wins and setting a game fee for each determined flag value.

(Steps S15 and S16)

In step S15, the main control program P1a starts the timer 9b to start counting time. In step S16, the program determines whether time is up before the player P presses the start button after inserting a necessary number of coins as the game fee which has been set in step S14 so as to try a post-victory bonus game. That is, the program counts the time until the player P inserts coins corresponding to one credit and presses the start button which confirms the selection to try the post-victory bonus game. The time limit is set, for example, ten seconds. If time is up, a "9", for example, is written in the outcome flag and the process goes to step S22. A "9" in the outcome flag indicates that the player P has chosen not to try the post-victory bonus game.

(Steps S17 and S18)

In step S17, similarly to step S2 described above, the game start permission program P1d counts the number of coins that the player P has thrown into the coin insertion device 9a. Then, in step S18, with similar processing in step S3 described above, it is determined whether or not the amount of coins inserted by the player P covers the credit for playing the post-victory bonus game. If the coins do not cover the credit for playing the post-victory bonus game, the process goes back to step S16.

(Step S19)

As it has been determined that the amount of coins inserted by the player P covers the credit for playing the post-victory bonus game in step S18, the main control program P1a causes the process to go back to step S16 repeatedly until the player presses the start (try) button which confirms the selection to try the post-victory bonus game. When a signal indicating that the start button has been pressed is inputted, the process goes to step S20.

The process steps from S14 to S19 described above constitute post-victory bonus game selection means of the present invention.

(Step 20)

In step 20, as the player P has chosen to try the post-victory bonus game, the area where the battle will take place in the next post-victory bonus game is renewed, and the process goes to step S8.

(Step S22)

In step S22 shown in FIG. 12, the result display screen control program P5e displays the battle result of the game which has just been played on the monitor 8. Next, the main control program P1a activates the IC card read/write program P2a, and writes the battle result of the current game which was stored in the RAM 24 in step S11, as well as data (experience points) in accordance with the battle result of a previous, if any, post-victory bonus game on the IC card 5. Thus, this data recorded on the IC card 5 is read out when the player P plays a game next time to obtain data necessary for another game.

(Step S23)

In step S23, the main control program P1a activates the card issuing device control program P2e to issue a new card 6 from the card issuing device 10. The new card 6 is provided to the player P so that the player P can use it when he/she plays a next game.

The card game machine 1 of the present invention issues one new card 6 to the player P for one game, but the machine of the present invention controls new cards 6 to be issued collectively in accordance with the number of games the player P has played. The control method in step S23 has the following aspects as shown in the flowchart of FIG. 11.

(Aspect 1 of the Card Issuance Process)

When the player plays a game and loses the battle, new cards 6 are issued collectively in accordance with the number of games the player P has played. For example, if the player loses the first game, a "1" is recorded in the flag indicating the number of games played in step S11, and therefore one new card 6 is issued. If the player P wins a game and plays the next post-victory bonus game but loses the same, similarly, a "2" is recorded in the flag indicating the number of games played, and therefore two new cards 6 are issued. Also, if the player wins the first post-victory bonus game and tries a second post-victory bonus game but loses the same, a "3," is recorded in the flag indicating the number of games played, and therefore three new cards 6 are issued collectively.

(Aspect 2 of the Card Issuance Process)

If the player P won a game but did not try a post-victory bonus game, a "9" is recorded in step S16 in the outcome flag in the RAM 24. In step S23, therefore, the outcome flag content may be checked first, so that, if a "9" has been recorded, then the new cards 6 are issued by the number corresponding to the flag indicating the number of games played recorded in the RAM 24. This way, for example, if the player P tried a post-victory bonus game once and won, but did not try another post-victory bonus game, a "9" has been recorded in the outcome flag and a "2" has been recorded in the flag indicating the number of games played, so that two new cards 6 are issued collectively.

(Aspect 3 of the Card Issuance Process)

If the player P wins a game, tries one post-victory bonus game after another, and the number of consecutive wins has reached a preset value V, then new cards 6 are issued collectively by the number corresponding to this number of consecutive wins V. This is possible by determining whether or not the value of the flag indicating the number of consecutive wins in the RAM 24 has reached a preset value V. The value which is smaller than this number of consecutive wins V by one, V−1, is the maximum possible number of consecutive wins for which the discount rate is applied for the game fee when trying a next game after winning one game, as described above.

According to the first to third aspects of the process of issuing new cards 6 described above of the present invention, the new card 6 is not issued every time a game ends, as with a conventional card game machine. This enables the player P to play a post-victory bonus game immediately after he/she has won the right to try the post-victory bonus game, with an advantage that the player P can start the post-victory bonus game with his motivation for the challenge kept high.

The control of the card issuing device 10 to issue a plurality of new cards 6 collectively may be achieved by the main control program instructing the number of new cards 6, which should be issued, to the card issuing device control program P2e. Inside the card issuing device 10, a rack or the like containing various different types of new cards 6 randomly stacked is installed. Thus, cards 6 are issued from the card issuing device 10 in the stacked order, but the types of the issued cards 6 are randomly ordered.

(Step S24)

In step S24, a "0" is recorded in the flag indicating the number of games played, the flag indicating the number of consecutive wins, and the outcome flag which are stored in the RAM 24 as described above, to clear the flags.

(Steps S25 and S26)

In step S25, the main control program P1a displays a screen on the monitor 8 to ask the player P whether or not he/she wishes to play another game (continue). If the player P chooses to play another game by operating the select buttons 11, the process goes back to step S2.

If the player P chooses not to play another game, the process goes to the next step S26, where processing is done to end the game. For example, the main control program P1a activates the IC card read/write program P2a to eject the IC card 5 from the IC card read/write device 9, and a "game over" screen is displayed on the monitor 8. When this processing of step S25 is complete, the player's current game ends. The player's IC card 5, purchased cards 6, and newly obtained cards 6 can be used when the player P plays a game next time.

In the processing described above in step S23, the number of games the player P has played is determined by referring to a value recorded in the flag indicating the number of games played, but it can also be determined in the following manner using the flag indicating the number of consecutive wins and the outcome flag described above.

For example, if the player loses a first game, a "0" is recorded in the flag indicating the number of consecutive wins, and a "1", which means a loss, is recorded in the outcome flag, and therefore the number of games played can be determined as "1".

If the player wins a first game but loses the next post-victory bonus game, a "1" is recorded in the flag indicating the number of consecutive wins, and a "1", which means a loss, is recorded in the outcome flag, and therefore the number of games played can be determined by adding one to the value of the flag indicating the number of consecutive wins.

If the player P won a game but did not try a post-victory bonus game, a "9" has been recorded in the outcome flag, and a value is recorded in the flag indicating the number of consecutive wins, which will be equal to the number of games played.

If the number of consecutive wins has reached a preset value V, a "2" meaning a win is recorded in the outcome flag and the value V is recorded in the flag indicating the number of consecutive wins, and therefore the number of games played equals to this value V.

This way, in step S23, the value of the flag indicating the number of consecutive wins can be adopted as the number of games played if a "2" meaning a win has been recorded in the outcome flag, and if a "1" meaning a loss has been recorded in the outcome flag, then a value obtained by adding one to the flag indicating the number of consecutive wins can be adopted as the number of games played.

The program, which controls one embodiment of the card game machine 1 of the present invention as described above, need not necessarily be configured as shown in FIG. 10. Another configuration may be adopted in which, for example, there are module programs divided for each necessary function, and these module programs are combined for each unit of processing as required to operate the card game machine 1.

The embodiment described above has been described as a battle game set in a war-torn era by way of example, but the present invention can also be applied to sport card games such as football simulation games.

The present invention can also be applied to a game in which a play item such as a card is issued irrespective of the game results after the game has been played by a plurality of players. The outcome of a game, a win or a loss, can be applied to both game modes in which players compete against each other or players cooperate with each other to fight against the computer (CPU).

Furthermore, the invention is applicable to a game which is played with shaped articles such as figures, with stickers or the like printed with coded information stuck on the back side of the figure stand. For such a game which uses shaped articles, a device which issues such shaped articles is provided in place of the card issuing device 10 shown in FIG. 2.

The present invention provides the following advantages:

1) The game machine of the present invention is a game machine mainly for players to compete against each other. However, the machine does not adopt means which issues one new play item such as a card as a freebie to the player every time one game ends. Instead, the machine adopts means which issues new play items collectively by the number of games which have been played when the player wins a game or games consecutively. A player would feel more pleased with his/her victory if he/she obtains new play items collectively as described above. This way, the present invention provides a game machine which enables a player to concentrate in each game he/she plays to achieve a victory, which is an outcome of the game. This is particularly advantageous when the player plays a game with another person as the opponent. As compared to a machine which issues one play item as a freebie each time a game ends, the player may have to play two or more games until play items are issued, which reduces the possibility that the player may feel less interested in playing another game after one game ends when he/she happens to obtain a high-value play item and becomes satisfied with it.

2) When a player achieves a "victory" as an outcome of a game, the fee for the next post-victory bonus game is discounted. If the player wins this post-victory bonus game and tries another post-victory bonus game, the game fee is discounted again. The game fee is thus discounted in accordance with the number of consecutive wins, and this way the present invention provides a game machine which enables a player to concentrate in each game he/she plays and which gives the winner of a game a strong motivation to play another game.

3) When a player has won a game and tries the next post-victory bonus game, no new play item is issued. This enables the player to start the next post-victory bonus game in a very short period of time, i.e., to try this next game with his/her motivation for the challenge kept high.

4) With the first to third features described above, it is prevented that a player loses a game intentionally to end the game fast so as to get a new play item. This way, the present invention provides a game machine which keeps the opponent player who wants to play a fair play with well-thought tactics to be interested in playing the games. Also, the invention provides a game machine which can increase the occupancy rate and the profit of an amusement arcade or the like.

The invention claimed is:

1. A game machine configured to allow a player to execute a game play against an opponent who operates another game machine which is connected to said game machine via a communication network, said game machine comprising:

a play item setting place on which one or more play items, each of which is stored with data specifying a game character assigned to the respective play item, are to be placed by the player so as to allow the player to configure a game play to be executed on the game machine and to control the progress of the game play;

game fee watching means configured to watch the balance of a game fee deposited by the player;

data reading means configured to read data recorded on a play item or items placed on said play item setting place;

play item issuing means configured to discharge a play item out from the game machine to the player so as to allow the player to use the discharged play item as one of the play items on executing another game play; and game progress control means configured to allow the player to execute the game play based on the data read from the play item or items placed on the play item setting place against the opponent player with a certain credit of the game fee and to control said play item issuing means to discharge a new play item out to the player regardless of winning or losing the game play when the player has selected not to continue playing a game on the game machine, wherein said game progress control means is configured to perform:

(a) allowing the player to execute a game play when the balance of the game fee deposited by the player meets a first credit value for executing the game play;

(b) allowing the player to select successively trying a next game play with a second credit value set lower than said first credit value when the player has won at (a);

(c) allowing the player to execute the next game play without discharging a new play item out from the play item issuing means, when the player has selected to continue trying the next game play and when the balance of the game fee deposited by the player meets the second credit value, while reserving the player's right to have a new play item issued from the play item issuing means;

(d) allowing said player to select successively trying a further next game play with a third credit value set lower than said second credit value when the player has won at (c);

(e) allowing the player to execute the further next game play without discharging a new play item out from the play item issuing means, when the player has selected to continue trying the further next game play and when the balance of the game fee deposited by the player meets the third credit value, while reserving the player's right to have a further new play item, as well as the play item reserved at (c), issued from the play item issuing means; and (f) controlling said play item issuing means to discharge new game items all together including game item or items then reserved to the player, correspondingly to the number of successively tried game plays when, at (c) or thereafter, the player has lost, or the player has selected not to continue trying a next game play.

2. A game system including a plurality of game machines, each having the same configuration as the configuration of the game machine according to claim 1, connected with each other via a communication network so that game plays can be executed between/among said game machines.

3. A game progress control program computer readably stored in a storage medium provided with a game machine, wherein said game machine comprises a play item setting place on which one or more play items, each of which is stored with data specifying a game character assigned to the respective play item, are to be placed by a player so as to allow the player to configure a game play to be executed on the game machine and to control the progress of the game play; game fee watching means configured to watch the balance of a game fee deposited by the player; data reading means configured to read data recorded on a play item or items placed on said play item setting place; play item issuing means configured to discharge a play item out from the game machine to the player so as to allow the player to use the discharged play item as one of the play items on executing another game play; and game progress control means configured to allow the player to execute the game play based on the data read from the play item or items placed on the play item setting place against an opponent with a certain credit of the game fee and to control said play item issuing means to discharge a new play item out to the player regardless of winning or losing the game play when the player has selected not to continue playing a game on the game machine, said game progress control program, when executed on the game machine, causing the game machine to perform the steps of:

(a) allowing the player to execute a game play when the balance of the game fee deposited by the player meets a first credit value for executing the game play;

(b) allowing the player to select successively trying a next game play with a second credit value set lower than said first credit value when the player has won at (a);

(c) allowing the player to execute the next game play without discharging a new play item out from the play item issuing means, when the player has selected to continue trying the next game play and when the balance of the game fee deposited by the player meets the second credit value, while reserving the player's right to have a new play item issued from the play item issuing means;

(d) allowing the player to select successively trying a further next game play with a third credit value set lower than said second credit value when the player has won at (c);

(e) allowing the player to execute the further next game play without discharging a new play item out from the play item issuing means, when the player has selected to continue trying the further next game play and when the balance of the game fee deposited by the player meets the third credit value, while reserving the player's right to have a further new play item, as well as the play item reserved at (c), issued from the play item issuing means; and (f) controlling said play item issuing means to discharge new game items all together including the game item or items then reserved to the player, correspondingly to the number of successively tried game plays when, at the process (c) or thereafter, the player has lost, or the player has selected not to continue trying a new game play.

4. A game apparatus comprising:

a panel configured for a game player to arrange a plurality of play items thereon, each of which is stored with data specifying a game character assigned to the respective play item, so as to allow the player to configure a game team including the game characters for a game play to be executed on the game machine and to control the progress of the game play;

a data reading means configured to read data from said plurality of play items arranged on the panel;

a game fee watching means configured to watch the balance of a game fee deposited by the game player;

a play item issuing means configured to discharge a play item out from the game apparatus so as to allow the player to use the discharged play item as one of the play items to be arranged on the panel on executing another game play; and a control means configured to virtually organize the game team including the game characters specified by the game items arranged on the panel based on the data read from the play items, to allow the game player to perform a game play with the game team and to control progress of the game play by moving the play item or items on the panel, and to cause said play item issuing means to discharge a new play item or items, when the game player has selected not to perform a next game play, wherein said control means performs:

(a) allowing the game player to execute the game play with the game team virtually organized on the game apparatus when the balance of the game fee deposited by the game player meets a first credit value for executing the game play;

(b) allowing the game player to select trying a next game play with a second credit value set lower than said first credit value when the game player has won at (a);

(c) allowing the game player to execute the next game play without discharging a new play item out from the play item issuing means, when the game player has selected trying the next game play and when the balance of the game fee deposited by the game player meets the second credit value, while reserving the game player's right to have a new play item issued from the play item issuing means;

(d) allowing the game player to select trying a further next game play with a third credit value set lower than said second credit value when the game player has won at (c);

(e) allowing the game player to execute the further next game play without discharging a new play item out from the play item issuing means, when the game player has selected trying the further next game play and when the balance of the game fee deposited by the game player meets the third credit value, while reserving the game player's right to have a further new play item, as well as the play item reserved at (c), issued from the play item issuing means; and (f) controlling said play item issuing means to issue new game items all together including the game item or items then reserved to the game player, correspondingly to the number of continuously tried game plays when, at (c) or thereafter, the game player has lost the game play, or selected not to continue trying a new game play.

5. A game apparatus arranged to allow a game player to perform a game play by setting game items to the game apparatus, wherein the each game item is recorded with data specifying a game character assigned to the respective game item, said game apparatus comprising:

a data reading means configured to read data from the game item set to the game apparatus;

a game fee watching means configured to watch the balance of a game fee deposited by the game player;

a play item issuing means configured to discharge a play item out from the game apparatus to the player so as to allow the player to use the discharged play item as one of the play items on executing another game play; and a control means configured to allow the game player to perform a game play with the game characters specified by the game items set to the game apparatus based on the data from the data reading means and to control said play item issuing means to discharge a new play item or items, when the game player has selected not to perform a nest game play, wherein said control means performs:

(a) allowing the game player to execute a game play with the game characters specified by the game items set to the game apparatus when the balance of the game fee deposited by the game player meets a first credit value for executing the game play;

(b) allowing the game player to select trying a next game play with a second credit value set lower than said first credit value when the game player has won at (a);

(c) allowing the game player to execute the next game play while reserving the game player's right to have a new play item issued from the play item issuing means, when the game player has selected trying the next game play and when the balance of the game fee deposited by the game player meets the second credit value;

(d) allowing the game player to select trying a further next game play with a third credit value set lower than said second credit value when the game player has won at (c);

(e) allowing the game player to execute the further next game play while reserving the game player's right to have a further new play item, as well as the play item reserved at (c), issued from the play item issuing means, when the game player has selected trying the further next game play and when the balance of the game fee deposited by the game player meets the third credit value; and (f) controlling said play item issuing means to discharge new game items all together including the game item or items then reserved to the game player, correspondingly to the number of continuously tried game plays when, at (c) or thereafter, the game player has lost, or selected not to continue trying a new game play.

6. A game apparatus arranged to allow a game player to perform a game play by setting a game item or items to the game apparatus, wherein the each game item is recorded with data specifying a game character assigned to the respective game item, said game apparatus comprising:

a data reading means configured to read data from the game item set to the game apparatus;

a game fee watching means configured to watch the balance of a game fee deposited by the game player;

a play item issuing means configured to discharge a play item out from the game apparatus to the game player so as to allow the player to use the discharged play item as one of the play items on executing another game play; and a control means configured to allow the game player to perform a game play based on the data read from the game item or items set to the game apparatus and to control said play item issuing means to discharge a new play item or items, when the game player has selected not to perform a nest game play, wherein said control means performs:

(a) allowing the game player to execute a game play when the balance of the game fee deposited by the game player meets a credit value for executing the game play;

(b) allowing the game player to select trying a next game play with a discounted credit value when the game player has won the current game play;

(c) allowing the game player to execute the next game play while reserving the game player's right to have a new play item issued from the play item issuing means when the game player has selected trying the next game play and when the balance of the game fee deposited by the game player meets the discounted credit value;

(d) repeating (b) and (c) with the discounted credit value set lower than for the preceding game play at respective rounds of repeating until the game player has lost the current game play, or selected not to continue trying a new game play; and then (e) controlling said play item issuing means to discharge new game items all together including the game item or items then reserved to the game player, correspondingly to the number of continuously tried game plays when the game player has lost the current game play, or selected not to continue trying a new game play.

* * * * *

UNITED STATES PATENT AND TRADEMARK OFFICE
CERTIFICATE OF CORRECTION

PATENT NO. : 7,934,992 B2  
APPLICATION NO. : 11/665257  
DATED : May 3, 2011  
INVENTOR(S) : Toru Ohara et al.

It is certified that error appears in the above-identified patent and that said Letters Patent is hereby corrected as shown below:

IN THE SPECIFICATION:

Column 7, line 38, delete "?", and substitute therefore -- $\alpha$ --; and

Column 8, line 24, delete "indifferent" and substitute therefore -- in different --.

IN THE CLAIMS:

Claim 6, line 26, before "credit", insert -- first --.

Signed and Sealed this
Nineteenth Day of February, 2013

Teresa Stanek Rea
*Acting Director of the United States Patent and Trademark Office*